United States Patent
Fujiki et al.

(10) Patent No.: US 7,562,698 B2
(45) Date of Patent: Jul. 21, 2009

(54) VEHICULAR AIR-CONDITIONING SYSTEM

(75) Inventors: Tsutomu Fujiki, Wako (JP); Shinji Yasuno, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 738 days.

(21) Appl. No.: 11/337,758

(22) Filed: Jan. 23, 2006

(65) Prior Publication Data
US 2006/0162359 A1 Jul. 27, 2006

(30) Foreign Application Priority Data
Jan. 24, 2005 (JP) ............... 2005-015952

(51) Int. Cl.
*B60H 1/00* (2006.01)
*B60H 1/32* (2006.01)

(52) U.S. Cl. ............ 165/202; 165/11.1; 165/42; 165/43; 62/228.4; 62/228.5; 62/229; 62/230; 62/236; 62/323.3; 62/244; 62/133

(58) Field of Classification Search ........... 165/11.1, 165/42, 43, 202; 62/228.4, 228.5, 229, 230, 62/236, 323.3, 244, 133
See application file for complete search history.

(56) References Cited

U.S. PATENT DOCUMENTS

| | | | | |
|---|---|---|---|---|
| 5,775,415 A | * | 7/1998 | Yoshimi et al. | 165/202 |
| 5,937,941 A | * | 8/1999 | Gach | 165/204 |
| 6,532,926 B1 | * | 3/2003 | Kuroda et al. | 123/179.4 |
| 6,634,447 B1 | * | 10/2003 | Matsubara et al. | 180/65.26 |
| 6,758,049 B2 | * | 7/2004 | Adachi et al. | 62/115 |
| 6,761,037 B2 | * | 7/2004 | Tsuboi et al. | 62/244 |
| 6,782,704 B2 | * | 8/2004 | Kuroda et al. | 62/133 |
| 6,786,055 B2 | * | 9/2004 | Inoue et al. | 62/133 |
| 6,796,138 B1 | * | 9/2004 | Imai et al. | 62/236 |
| 6,823,687 B2 | * | 11/2004 | Fukumi et al. | 62/228.5 |
| 6,892,549 B2 | * | 5/2005 | Komura et al. | 62/228.5 |
| 6,955,060 B2 | * | 10/2005 | Homan et al. | 62/228.4 |
| 2002/0157414 A1 | * | 10/2002 | Iwanami et al. | 62/239 |
| 2003/0136138 A1 | * | 7/2003 | Tsuboi et al. | 62/228.1 |
| 2003/0233840 A1 | * | 12/2003 | Choi | 62/236 |
| 2004/0144107 A1 | * | 7/2004 | Breton et al. | 62/129 |
| 2004/0187506 A1 | * | 9/2004 | Iwanami et al. | 62/236 |

FOREIGN PATENT DOCUMENTS

| JP | 03159815 A | * | 7/1991 |
|---|---|---|---|
| JP | 05278432 A | * | 10/1993 |
| JP | 06-323649 | | 11/1994 |
| JP | 07276977 A | * | 10/1995 |
| JP | 2004196160 A | * | 7/2004 |
| JP | 2004353470 A | * | 12/2004 |

* cited by examiner

*Primary Examiner*—John K Ford
(74) *Attorney, Agent, or Firm*—Rankin, Hill & Clark LLP

(57) ABSTRACT

An air-conditioning system for a vehicle having an engine adapted to stop idling on predetermined stop conditions of the vehicle, which system comprises an electric motor for driving a refrigerant compressor when the engine idling is stopped, motor speed control means for controlling the speed of the motor in correspondence with an evaporator outlet temperature, and evaporator temperature correction means for, when the engine idling is stopped while outside air is being introduced, correcting the evaporator outlet temperature to a lower temperature in correspondence with a temperature of the outside air and a temperature of engine cooling water.

5 Claims, 4 Drawing Sheets

VEHICULAR AIR-CONDITIONING SYSTEM

FIELD OF THE INVENTION

The present invention relates generally to an air-conditioning system and, more particularly, to an air-conditioning system for a vehicle carrying an idling-stop system for temporarily stopping idling of an engine of the vehicle.

BACKGROUND OF THE INVENTION

Conventional vehicular air-conditioning systems typically use a vapor-compression refrigeration system, which includes a closed circuit (refrigeration cycle) having a compressor, a condenser, an expansion valve and an evaporator. Refrigerant circulates through the closed circuit. The refrigerant vaporizes as it absorbs heat from air within a passenger compartment of a vehicle to thereby cool the air.

More specifically, the refrigerant in a liquid state passes through an expansion valve where the refrigerant undergoes adiabatic expansion and decreases in pressure and temperature. Thereafter, the refrigerant in the form of mist enters an evaporator and vaporizes upon absorbing heat from air within a passenger compartment. The heated vapor refrigerant is then fed into a compressor where the vapor refrigerant undergoes adiabatic compression and turns into a high-temperature/high-pressure gaseous state. The gaseous refrigerant then advances to a condenser to release heat outwardly and condense into a liquid state, which liquid refrigerant is returned to the expansion valve.

Such a refrigeration cycle is also used in an air-conditioning system for a vehicle carrying an idling-stop system. The idling-stop system is designed to temporarily stop idling of an engine when a vehicle state satisfies predetermined stop conditions to thereby reduce fuel consumption. In such a vehicle, the engine cannot drive the compressor during its idling-stopped state. Thus, the compressor needs to be driven by an electric motor rather than by the engine. An electric motor designed for such a purpose is known from, for example, JP-A-6-323649. Speed of the known electric motor is controlled in correspondence with a temperature at an outlet of the evaporator.

When outside air is introduced into the air-conditioning system during the idling-stopped state of the engine, the introduced air may be influenced by heat from an engine compartment side. As a result, when the air passes through an outlet of the evaporator, the air may exhibit a temperature about 10° C. greater than when it began being introduced into the air-conditioning system. In this instance, the electric motor whose speed is controlled in correspondence with a temperature of the air at the outlet of the evaporator can be driven under an unnecessary condition or at an unnecessarily high speed due to the greater air temperature at the outlet of the evaporator, thus resulting in excessive consumption of electric power.

SUMMARY OF THE INVENTION

It is therefore an object of the present invention to provide a vehicular air-conditioning system which is designed to prevent an electric motor from being driven under an unnecessary condition or at an unnecessarily high rotational speed while outside air is being introduced into the air-conditioning system with an engine placed in an idling-stopped condition, to thereby prevent excessive consumption of electric power.

The present inventors have found that the increase in temperature of the air at the outlet of the evaporator derives from the temperature of outside air and the temperature of engine-cooling water, and this lead to the present invention.

According to an aspect of the present invention, there is provided an air-conditioning system for a vehicle having an engine adapted to stop idling on predetermined stop conditions of the vehicle, the air-conditioning system comprising: a compressor for compressing a refrigerant circulated in a refrigeration cycle; a blowing fan for introducing outside air and producing air-conditioning air; an evaporator for cooling the air-conditioning air by causing the refrigerant to evaporate; an electric motor for driving the compressor when the idling of the engine is stopped; an evaporator temperature sensor for detecting a temperature at an outlet of the evaporator; motor speed control means for controlling a speed of the electric motor in correspondence with the detected evaporator outlet temperature; and evaporator temperature correction means for, when the engine idling is stopped and the blowing fan is introducing the outside air, correcting the evaporator outlet temperature, detected by the evaporator temperature sensor, to a lower temperature in correspondence with a temperature of the outside air and a temperature of water for cooling the engine.

When idling of the engine is stopped while the outside air is being introduced into the air-conditioning system, influences of the temperature of the outside air and the temperature of the engine-cooling water, which can cause undesirable increase in temperature at the outlet of the evaporator, can be removed from the temperature, detected by the evaporator temperature sensor, to provide appropriately low temperature for use as the temperature at the outlet of the evaporator. Thus, it becomes possible to prevent the electric motor from being driven under the inappropriate condition or at the higher speed than is necessary when the outside air is introduced into the air-conditioning system while the engine stops. This can eliminate concern over excessive consumption of electric power.

It is preferable that the air-conditioning system further comprises an outside air temperature sensor and an engine cooling water temperature sensor, and the evaporator temperature correction means calculates the evaporator outlet temperature to be used in control by the motor speed control means, by subtracting, from the evaporator outlet temperature detected by the evaporator temperature sensor, a value corresponding to an outside air temperature detected by the outside air temperature sensor and a value corresponding to an engine cooling water temperature detected by the engine cooling water temperature sensor.

In a preferred form, the value corresponding to the outside air temperature detected by the outside air temperature sensor is characteristic such that it becomes smaller as the outside air temperature grows larger.

It is preferred that the value corresponding to the engine cooling water temperature detected by the engine cooling water temperature sensor is characteristic such that it becomes larger as the engine cooling water temperature grows larger.

Desirably, the motor speed control means is designed to retrieve a value for controlling the motor speed from a map containing electric motor speeds associated with evaporator outlet temperatures.

BRIEF DESCRIPTION OF THE DRAWINGS

A preferred embodiment of the present invention will be described in detail below, by way of example only, with reference to the accompanying drawings, in which.

DETAILED DESCRIPTION OF THE PREFERRED EMBODIMENT

Figure 1:
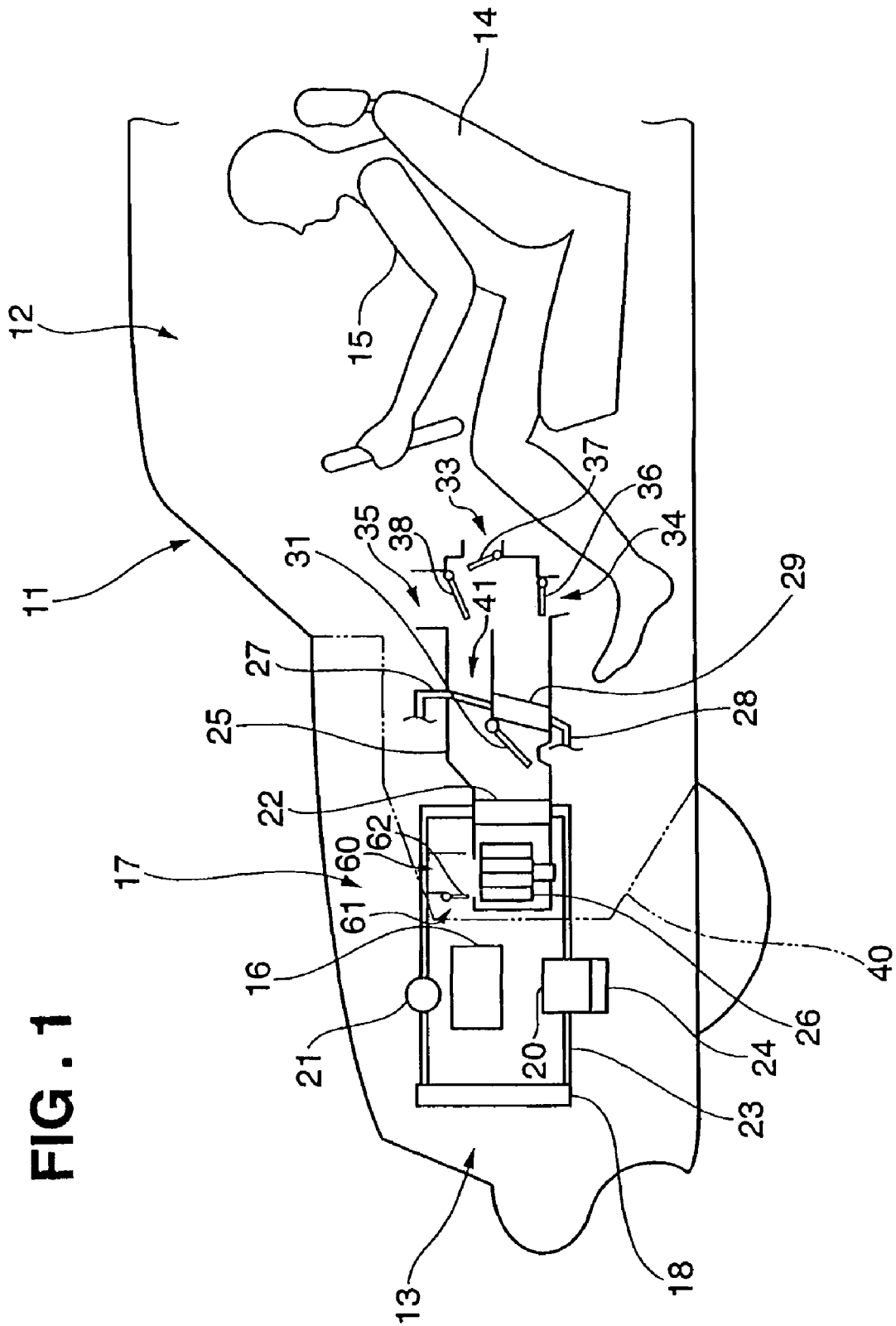
FIG. 1 is a schematic side elevational view showing a front half of an automobile employing an air-conditioning system according to the present invention.

Referring to FIG. 1, there are shown a passenger compartment 12 and an engine compartment 13 of an automobile 11. A driver 15 sits on a seat 14 within the passenger compartment 12. An engine 16 is disposed within the engine compartment 13. The engine 16 outputs motive power to be transmitted by a transmitting mechanism (not shown).

The automobile 11 includes an idling-stop system, not shown, for temporarily stopping idling of the engine 16 when the automobile 11 is place in a state which satisfies predetermined stop conditions.

Arrangement of an air conditioning system 17 will be described now. A condenser 18 and a condenser fan (not shown) are disposed forwardly of the engine 16. Connected through refrigerant pipes 23 to the condenser 18 are a compressor 20 and an expansion valve 21. Connected through refrigerant pipes 23 to the compressor 20 and the expansion valve 21 is an evaporator 22. The condenser 18, the compressor 20, the expansion valve 21, the evaporator 22 and the refrigerant pipes 23 jointly form a refrigerant cycle.

The compressor 20 is driven by an electric motor 24. Low-temperature/low-pressure gaseous refrigerant, which has been evaporated within the evaporator 22, is sucked into the compressor 20 through a sucking port of the compressor 20. The compressor 20 compresses the gaseous refrigerant to provide high-temperature/high pressure gaseous refrigerant. The compressor then discharges the high-temperature/high-pressure gaseous refrigerant out through a discharge port of the compressor 20 and delivers the refrigerant to the condenser 18.

The condenser 18 condenses the high-temperature/high-pressure gaseous refrigerant delivered from the compressor 20 to provide liquid refrigerant. The condensing of the refrigerant is achieved by heat exchange between the refrigerant and outside air forced by a condenser fan (not shown) through the condenser 18. The condenser 18 delivers the liquid refrigerant to the expansion valve 21.

The expansion valve 21 decreases pressure of the liquid refrigerant (of high-temperature and high-pressure) and expands the liquid refrigerant to provide a mist refrigerant (of low-temperature and low-pressure).

The evaporator 22, disposed within an air-conditioning duct 25, cools air forced by a fan 26 through the evaporator 22. The cooling of the air is achieved by heat exchange between the mist refrigerant and the air forced by the fan 26 through the evaporator 22.

The air-conditioning system 17 includes pipes 27, 28 and a heater core 29 connected to the pipes 27, 28 to provide a flow path (heating circuit) through which a hot water circulates. The heater core 29 is a heat exchanger. The pipe 28 is equipped with a water valve (not shown). The heater core 29 is disposed within the air-conditioning duct 25.

The air-conditioning duct 25 has an outside air inlet 60 and an inside air inlet 61. The duct 25 is equipped with an intake door 62 for selectively allowing outside air to be introduced through the outside air inlet 60 towards the fan 26 or inside air to be introduced through the inside air inlet 61 towards the fan 26. The fan 26, the evaporator (an indoor heat exchanger) 22, an air mix door 31 movable between an opened position and a closed position, and the heater core 29 are disposed within the duct 25. The air-conditioning duct 25 has discharge ports 33, 34, 35. The intake door 62, the fan 26, the evaporator 22, the air mix door 31, the heater core 29, and the discharge ports 33, 34, 35 are provided in the named order from an upstream side on which the engine compartment 13 is formed to a downstream side on which the passenger compartment 12 is formed. The evaporator 22 cools the air delivered by the fan 26 thereto.

The discharge port 33 is a vent directed to an upper half body of the driver 15. The discharge port 34 is a foot opening directed to a lower half body of the driver 15. The discharge port 35 is directed to an interior side of a windshield of the automobile 11. The discharge port 34 is selectively opened and closed by a heater door 36 disposed within the discharge port 34. The discharge port 33 is selectively opened and closed by a vent door 37 disposed within the discharge port 33. The discharge port 35 is selectively opened and closed by a defroster door 38 disposed within the discharge port 35.

Figure 2:
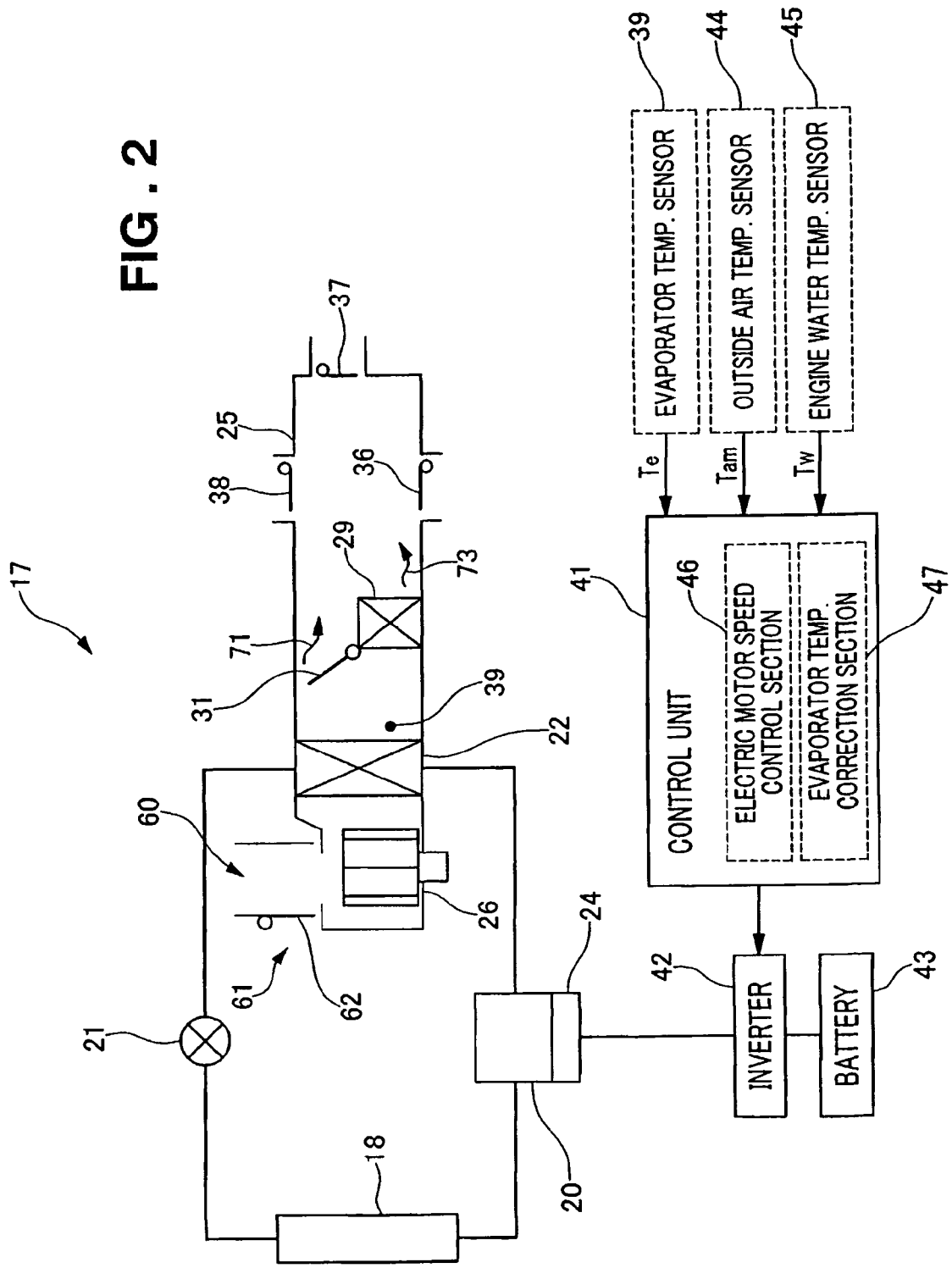
FIG. 2 is a diagrammatical view illustrating the air-conditioning system and a control system of the latter.

An evaporator temperature sensor 39 (FIG. 2) is disposed on an outlet side of the evaporator 22 within the air-conditioning duct 25. The evaporator temperature sensor 39 detects temperature Te at an outlet of the evaporator 22. An output of the sensor 39 is input to a control unit 41 (FIG. 2).

Air within the air-conditioning duct 25 is separated by the air mix door 31 into a hot air part 73 passing through the heater core 29 and a non-hot air part 71 bypassing the heater core 29.

Provision of the thus arranged duct 25 enables air having its temperature adjusted to be supplied into the passenger compartment 12. The passenger compartment 12 is separated from the engine compartment 13 by a partition wall 40.

The evaporator 22 in the refrigeration cycle cools air passing through the evaporator 22. The cooled air can be supplied to the passenger compartment 12.

Turning now to FIG. 2, the air-conditioning system 17 includes an electric motor 24 for driving the compressor 20, an inverter 42 for driving the electric motor 24, and a battery 43. The air-conditioning system 17 also includes the evaporator temperature sensor 39, an outside air temperature sensor 44, an engine water temperature sensor 45, and the control unit 41.

The air-conditioning system 17 provides a variety of discharge modes manually or automatically set for opening/closing the heater door 36, the vent door 37, or the defroster door 38. The discharge modes include a defroster mode, a heater/defroster mode, a vent mode, a bi-level mode, and a heater mode. Each one of the defroster mode, the heater/defroster mode, the vent mode, the bi-level mode and the heater mode can be selected. When any one of the defroster mode, the heater/defroster mode and the heater mode is selected, the defroster door 38 is opened. When either the vent mode or the bi-level mode is selected, the vent door 37 is opened. When any one of the heater mode, the heater/defroster mode and the bi-level mode is selected, the heater door 36 is opened. The control unit 41 is supplied with a signal regarding one selected from the above modes.

The outside air temperature sensor 44 detects temperature Tam of outside air. An output from the sensor 44 is input to the control unit 41. The engine water temperature sensor 45 detects temperature Tw of engine-cooling water. An output from the sensor 45 is input to the control unit 41.

The control unit 41 controls the electric motor 24 through the inverter 42. The control unit 41 includes an electric motor speed control section 46 and an evaporator temperature correction section 47. The electric motor speed control section 46 controls a speed of the electric motor 24 in correspondence to the temperature Te at the outlet of the evaporator 22.

The evaporator temperature correction section 47 corrects the temperature, detected by the evaporator temperature sensor 39, in correspondence with the temperature Tam of the outside air and the temperature Tw of the engine-cooling water as the outside air is introduced into the air-conditioning system 17 during stop of idling of the engine 16, whereby the evaporator temperature correction section 47 provides a corrected temperature lower than the temperature detected by the sensor 39. The evaporator temperature correction section 47 regards the corrected temperature as the temperature Te at the outlet of the evaporator 22. The control unit 41 can be a computer mounted on the automobile 11.

Input to the control unit 41 are a signal regarding the temperature Te at the outlet of the evaporator 22 and output from the evaporator temperature sensor 39, a signal regarding the temperature Tam of the outside air and output from the outside air temperature sensor 44, and a signal regarding the temperature Tw of the engine-cooling water and output from the engine water temperature sensor 45.

Figure 3:
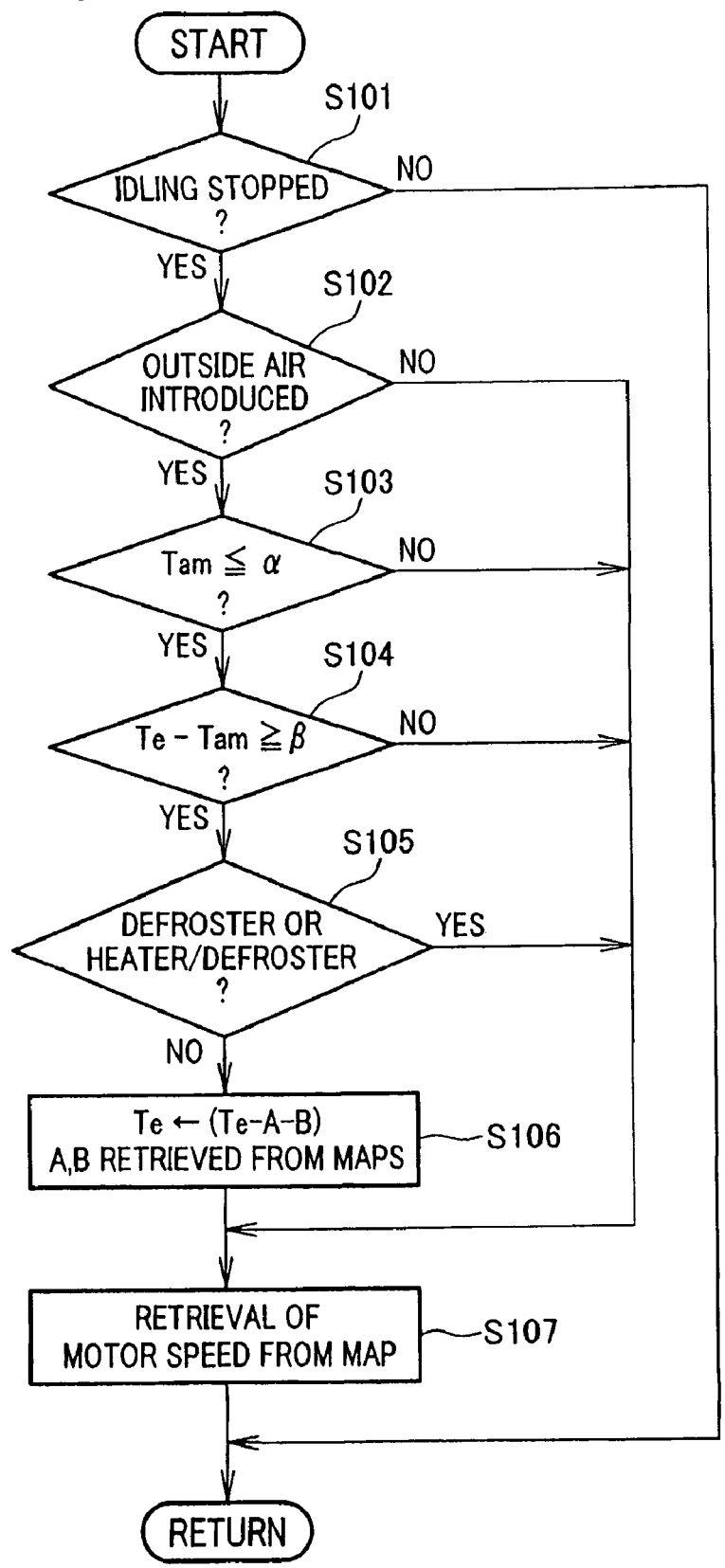
FIG. 3 is a flowchart showing how a an electric motor is controlled during an idling-stopped state of an engine.

With the above various signals input to the control unit 41, the control unit 41 controls the electric motor 24 through the inverter 42 in accordance with a flow chart shown in FIG. 3.

The flowchart shown in FIG. 3 will be explained with reference to FIG. 2 to FIG. 5. The flowchart shows how the control unit 41 operates for controlling the electric motor 24 when the idling of the engine 16 is stopped. It is to be noted that each step for controlling the electric motor 24 will be hereinafter referred to as "ST".

S101: it is determined whether the idling of the engine 16 is stopped. If not, the operation of the control unit 41 returns to START. When the idling of the engine 16 is stopped, the control proceeds to ST102.

S102: it is determined whether the outside air is introduced into the air-conditioning system 17. If not, the operation of the control unit 41 proceeds to ST107. If the outside air is introduced into the air-conditioning system 17, the operation is transferred to ST103.

ST103: it is determined whether the temperature Tam is equal to or lower than a predetermined temperature α. If the temperature Tam is higher than the predetermined temperature α, the operation of the control unit 41 proceeds to ST107. The predetermined temperature α is set to, for example, 5 degrees Celsius. When the temperature Tam is higher than the predetermined temperature α, it is less necessary to correct the temperature Te at the outlet of the evaporator 22. Thus, provision of such a higher temperature Tam is not considered a condition under which correction should be made to the temperature Te. If the temperature Tam is equal to or lower than the predetermined temperature α, the operation of the control unit 41 proceeds to ST104.

ST104: it is determined whether a difference (Te−Tam) is equal to or higher than a predetermined temperature β. If the difference (Te−Tam) is lower than the predetermined temperature β, the operation of the control unit 41 proceeds to ST107. The predetermined temperature β is set to, for example, 5 degrees Celsius. When the difference (Te−Tam) is lower than the predetermined temperature β, it is less necessary to correct the temperature Te at the outlet of the evaporator 22. Thus, provision of such a lower difference (Te−Tam) is not considered a condition under which correction should be made to the temperature Te. If the difference (Te−Tam) is equal to or higher than the predetermined temperature β, the operation of the control unit 41 proceeds to ST105.

ST105: it is determined whether either the defroster mode or the heater/defroster mode is selected. If so, the operation of the control unit 41 proceeds to ST107. Selection of either the defroster mode or the heater/defroster mode is not considered a condition under which correction should be made to the temperature Te, because in either the defroster mode or the heater/defroster mode the evaporator 22 should dehumidify the passenger compartment 12 for defrosting the interior side of the windshield. If neither the defroster mode nor the heater/defroster mode is selected, the operation of the control unit 41 proceeds to ST106.

ST106: the temperature Te is corrected to temperature (Te−A−B). The symbol "A" used herein represents a first correction value (° C.) to be decided in relation to the outside air temperature Tm, while the symbol "B" used herein represents a second correction value (° C.) to be decided in relation to the engine cooling water temperature Tw. The values A and B are retrieved from maps shown in FIG. 4 and FIG. 5.

Figure 4:
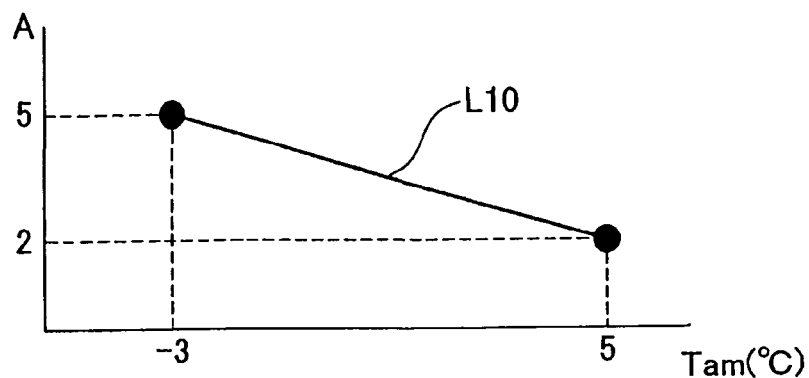
FIG. 4 is a view of a map showing a relationship between outside air temperatures and values to be used for correcting temperatures detected by an evaporator temperature sensor of the air-conditioning system.

In the map shown in FIG. 4, a horizontal axis shows the temperature Tam of the outside air while a vertical axis shows the value A. A straight line L10 is a graph of the value A versus the temperature Tam.

Figure 5:
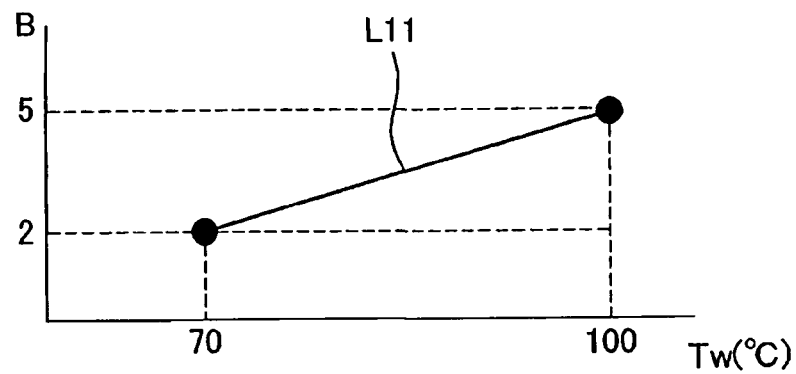
FIG. 5 is a view of a map showing a relationship between engine cooling water temperatures and values to be used for correcting temperatures detected by the evaporator temperature sensor.

In the map shown in FIG. 5, a horizontal axis shows the temperature Tw of the engine-cooling water while a vertical axis shows the value B. A straight line L11 is a graph of the value B versus the temperature Tw.

In ST 106, the value A corresponding to the temperature Tam indicated by the signal input to the control unit 41 is retrieved from the map shown in FIG. 4. Similarly, the value B corresponding to the temperature Tw indicated by the signal input to the control unit 41 is retrieved from the map of FIG. 5. The temperature Te is corrected using these retrieved values A, B.

Figure 6:
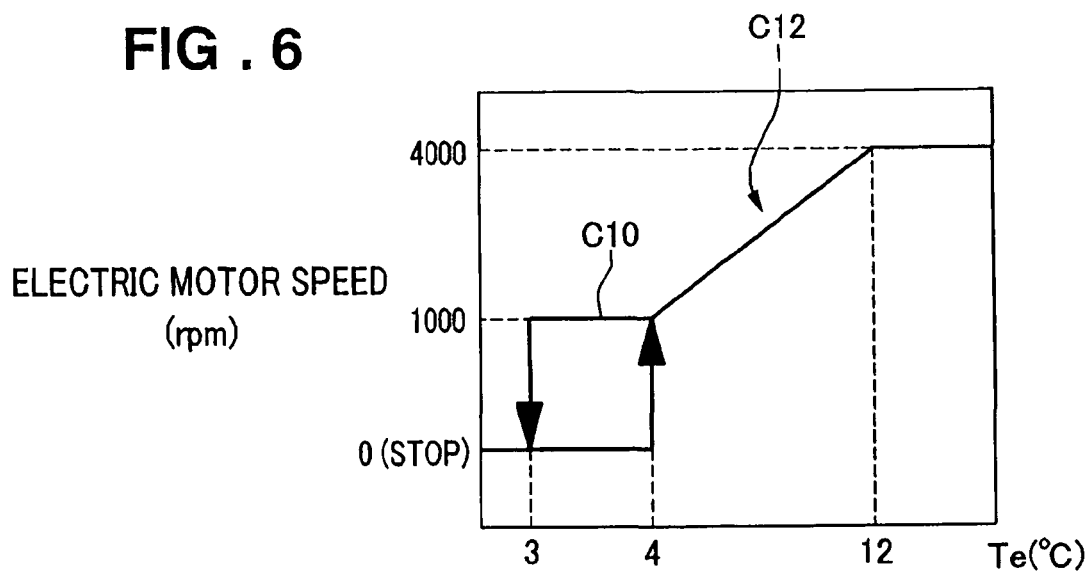
FIG. 6 is a view of a map showing a relationship between electric motor speeds and evaporator outlet temperatures.

ST107: the speed of the electric motor 24 is retrieved from a map of FIG. 6.

FIG. 6 shows a graph, used as the map, of the speed of the electric motor 24 versus the temperature Te used in ST107. A horizontal axis shows the temperature Te while a vertical axis shows the speed of the electric motor 24. A line C12 is a graph of the speed of the electric motor 24 versus the temperature Te. When the temperature Te is between 3 degrees Celsius and 4 degrees Celsius at a time of an initial retrieval of the speed of the electric motor 24, the speed of the electric motor 24 is 0 (rpm) rather than 1000 (rpm). The speed of the electric motor 24 varies along a line C10 when the speed of the electric motor 24 is reduced from a higher speed.

As discussed above, when the outside air is introduced into the air-conditioning system 17 during the stop of the idling of the engine 16, influences of the temperature Tam of the outside air and the temperature Tw of the engine-cooling water, which would contribute to increase in temperature Te at the outlet of the evaporator 22, can be removed from the temperature Te detected by the evaporator temperature sensor 39 to provide an appropriate temperature lower than the detected temperature Te. Such an appropriate lower temperature can be used as the temperature Te at the outlet of the evaporator 22.

It thus becomes possible to prevent the electric motor 24 from being driven under an inappropriate condition or at a higher speed than as actually required when the outside air is introduced into the air-conditioning system 17 during the idling-stopped state of the engine 16, with the result that excessive consumption of electric power is prevented.

In the illustrated embodiment, the compressor 20 is driven by the electric motor 24 regardless of whether the idling of the engine 16 is stopped. However, either the engine 16 or the electric motor 24 may be selected to drive the compressor 20, except where the electric motor 24 drives the compressor 20 as long as the idling of the engine 16 is stopped.

Alternatively, an engine-driven compressor and an electric motor-driven compressor may be provided in parallel in the refrigeration cycle in such a manner that only the electric motor-driven compressor is actuated when the idling of the engine 16 is stopped.

The speed of the electric motor 24 may be obtained by arithmetical operation rather than by retrieval from the maps as discussed above.

Obviously, various minor changes and modifications of the present invention are possible in the light of the above teaching. It is therefore to be understood that within the scope of the appended claims the invention may be practiced otherwise than as specifically described.

What is claimed is:

1. An air-conditioning system for a vehicle having an engine adapted to stop idling on predetermined stop conditions of the vehicle, the air-conditioning system comprising:
   a compressor for compressing a refrigerant circulated in a refrigeration cycle;
   a blowing fan for introducing outside air and producing air-conditioning air;
   an evaporator for cooling the air-conditioning air by causing the refrigerant to evaporate;
   an electric motor for driving the compressor when the idling of the engine is stopped;
   an evaporator temperature sensor for detecting a temperature at an outlet of the evaporator;
   motor speed control means for controlling a speed of the electric motor in correspondence with the detected evaporator outlet temperature; and
   evaporator temperature correction means for, when the engine idling is stopped and the blowing fan is introducing the outside air, correcting the evaporator outlet temperature, detected by the evaporator temperature sensor, to a lower temperature in correspondence with a temperature of the outside air and a temperature of water for cooling the engine.

2. The air-conditioning system of claim 1, further comprising an outside air temperature sensor and an engine cooling water temperature sensor, and wherein the evaporator temperature correction means calculates the evaporator outlet temperature to be used in control by the motor speed control means, by subtracting, from the evaporator outlet temperature detected by the evaporator temperature sensor, a value corresponding to an outside air temperature detected by the outside air temperature sensor and a value corresponding to an engine cooling water temperature detected by the engine cooling water temperature sensor.

3. The air-conditioning system of claim 2, wherein the value corresponding to the outside air temperature detected by the outside air temperature sensor has a characteristic such that it becomes smaller as the outside air temperature grows larger.

4. The air-conditioning system of claim 2, wherein the value corresponding to the engine cooling water temperature detected by the engine cooling water temperature sensor has a characteristic such that it becomes larger as the engine cooling water temperature grows larger.

5. The air-conditioning system of claim 1, wherein the motor speed control means is designed to retrieve a value for controlling the motor speed from a map containing electric motor speeds associated with evaporator outlet temperatures.

* * * * *